(12) United States Patent
Murase

(10) Patent No.: US 7,546,672 B2
(45) Date of Patent: Jun. 16, 2009

(54) METHODS FOR MANUFACTURING A MOTOR

(75) Inventor: Hiroshi Murase, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 11/783,416

(22) Filed: Apr. 9, 2007

(65) Prior Publication Data

US 2007/0271767 A1 Nov. 29, 2007

(30) Foreign Application Priority Data

Apr. 20, 2006 (JP) ............................. 2006-117066

(51) Int. Cl.
*H02K 15/00* (2006.01)
*H02K 15/14* (2006.01)

(52) U.S. Cl. ............................. 29/596; 29/598; 29/732; 310/42

(58) Field of Classification Search ........... 29/596–598, 29/605–609, 732–736; 310/259, 216, 49 R, 310/43, 42

See application file for complete search history.

(56) References Cited

U.S. PATENT DOCUMENTS

| 4,102,040 | A | * | 7/1978 | Rich | ............................. | 29/598 |
|---|---|---|---|---|---|---|
| 4,675,566 | A | * | 6/1987 | Nystuen et al. | ............. | 310/254 |
| 4,882,832 | A | * | 11/1989 | Lewis | ........................... | 29/596 |
| 5,457,873 | A | * | 10/1995 | Cattaneo | ...................... | 29/606 |
| 5,461,271 | A | | 10/1995 | Asama et al. | | |
| 5,592,731 | A | * | 1/1997 | Huang et al. | ................... | 29/596 |
| 5,760,521 | A | | 6/1998 | Ushiro | | |
| 6,181,041 | B1 | * | 1/2001 | Nose | ........................... | 310/164 |
| 6,777,852 | B2 | * | 8/2004 | Ishikawa et al. | ............ | 310/259 |

FOREIGN PATENT DOCUMENTS

| DE | 42 13 377 A1 | 10/1993 |
|---|---|---|
| EP | 0 436 721 A1 | 7/1991 |
| EP | 0 730 334 A1 | 9/1996 |
| GB | 2 266 413 A | 10/1993 |
| JP | A-08-147812 | 6/1996 |
| JP | A 2000-14098 | 1/2000 |

* cited by examiner

*Primary Examiner*—Minh Trinh
(74) *Attorney, Agent, or Firm*—Oliff & Berridge, PLC

(57) ABSTRACT

It is an object of the invention to provide a technique for easily installing many turns of a coil winding on a stator. Representative method for manufacturing a motor includes preparing the coil wound into a ring-like form and tied, preparing the split core such that the spacing between the pair pole pieces in the circumferential direction of the split core corresponds to the inner dimension of the coil in the circumferential direction of the split core, inserting the tied coil into the two coil receiving parts through the openings and then, deforming the split core such that the spacing between the pair pole pieces is increased to be longer than the inner dimension of the coil.

8 Claims, 8 Drawing Sheets

METHODS FOR MANUFACTURING A MOTOR

BACKGROUND OF THE INVENTION

1. Field of the Invention

The present invention relates to a method and device to manufacture a motor.

2. Description of the Related Art

An example of a stator of a conventional motor is shown in FIG. 16(A). In the motor, a plurality of Y-shaped field poles 11 are formed on an inner surface 10a of a stator body 10. A coil 14 is wound on each of the field poles 11. Generally, an automatic winding machine is frequently used to wind a coil on the stator body 10. An example of the automatic winding machine is disclosed in Japanese non-examined laid-open Patent Publication No. 2000-14098. As shown in FIG. 16(B), this winding machine winds a coil winding a number of turns on the field pole 11 into the coil receiving parts, such as coil winding n1 of a first turn and coil winding n2 of a second turn, one after another. Thus, a coil 14 of many turns can be installed on the field pole 11.

In the above-mentioned technique, the coil winding is wound on the field core 13 of the field pole 11 one turn at a time. Therefore, as the number of turns of the coil winding increases, as shown in FIG. 16(C), coil windings n50, n51 may not be engaged by the field pieces 12 of the field pole 11 and come away from the field pole 11. In order to prevent this problem, in the coil mounting technique using the known automatic winding machine, the number of turns of the coil winding is restricted according to the length of the pole pieces 12 of the field pole 11. However, it is important to secure high density of the coil winding on the stator body 10 in order to maintain a high output of the motor. Therefore, a more effective technique of installing a coil winding is desired.

SUMMARY OF THE INVENTION

Accordingly, it is an object of the invention to provide a technique for easily installing many turns of a coil winding on a stator.

The above-described object is achieved by the features of the claimed invention. According to the present invention, a representative method and device to manufacture a motor including a stator, split core and coil is provided. The coil is wound into a ring-like form and tied in advance and the tied coil is mounted to the split cores. The split core includes a field core, a pair of pole pieces and two coil receiving parts. The field core extends from an inner peripheral surface of the split core. The field core typically extends generally perpendicularly from the inner peripheral surface of the split core toward the center of the hollow part of the stator which is to be formed by the split cores Further, the pair pole pieces extend from both circumferential ends of the field core in a manner of intersecting with the field core and are generally referred to as a pole arc angle portion. The two coil receiving parts are defined by the field core, the pole pieces and the inner peripheral surface of the stator, and each of the coil receiving parts has an opening on the tip end side of the associated pole piece. The coil receiving parts are generally referred to as a slot as well.

The motor may preferably include a plurality of the split cores and coils corresponding to the split cores and at least one of the split cores may include the field core, the pole pieces and the coil receiving parts.

The ring-like tied coil is received in the coil receiving parts. The field core, the pole pieces and the coil form the field pole that is used to generate a magnetic field in order to drive the rotor in the motor. The "tied coil" represents a coil having a tied coil winding. Typically, the tied coil may be formed in a separate process by winding a coil winding into a ring-like form by using a coil winding machine and tying it into a unitized form by insulating paper or other similar material.

According to the invention, the process steps of manufacturing the motor having the above described construction includes preparing the coil wound into a ring-like form and tied, preparing the split core such that the spacing between the pair pole pieces in the circumferential direction of the split core corresponds to the inner dimension of the coil in the circumferential direction of the split core, inserting the tied coil into the two coil receiving parts through the openings, and deforming the split core such that the spacing between the pair pole pieces is ceased to be longer than the inner dimension of the coil.

The "spacing" may preferably include the manner of setting the spacing between the pair pole pieces to a distance corresponding to the inner dimension of the coil in the circumferential direction of the split core, when manufacturing the split core, the manner of bending (deforming) the split core inward to the inside and thereby narrowing the spacing between the pair pole pieces to a distance corresponding to the inner dimension of the coil in the circumferential direction of the split core, and the manner of forming the split core having two halves obtained by halving the split core in the circumferential direction and setting the relative position of the two halves such that the spacing between the pair pole pieces corresponds to the inner dimension of the coil in the circumferential direction of the split core.

Further, the "distance corresponding to the inner dimension" may preferably be defined by a distance long enough to allow the ring-like tied coil to be inserted into the coil receiving parts through the openings of the coil receiving parts, and includes not only a distance long enough to allow the cog to be inserted without interference with the pole pieces, but a distance just enough to allow the coil to be inserted with a slight frictional resistance. Further, the manner of "deforming" may typically represent a manner of bending the split core at a predetermined part, or if the split core has a two part structure halved in the circumferential direction, a manner of changing the relative position of two halves of the split core.

In the present invention, the spacing between the pair pole pieces is set to distance corresponding to the inner dimension of the coil. In this state, the tied ring-like coil is inserted into the coil receiving parts through the openings of the coil receiving parts. Particularly, when a split core is used, the coil can be easily installed in the coil receiving parts by utilizing the opening of the split core on the side of its inner peripheral surface. Moreover, the coil larger than the space of the coil receiving parts can be installed. Further, according to the invention, after the coil is inserted into tile coil receiving parts, the split core is deformed such that the spacing between the pair pole pieces is increased to be longer than the inner dimension of the coil. By this deformation, the coil can be retained by the pair pole pieces. Therefore, the coil of many turns can be installed and the coil winding in the coil receiving parts can be prevented from coming apart and being partly disengaged from the coil receiving parts over the pole pieces. Moreover, use of the tied coil eliminates the need for the pole pieces to retain each turn of the coil winding of the coil, so that the number of turns of the coil winding is not restricted by the length of the pole pieces. Therefore, the number of turns of the coil winding to be inserted into the limited space of the coil receiving parts can be effectively increased. Thus, a high motor output can be ensured while achieving size reduction of the motor.

As a representative device to manufacture the motor according to the invention, the device may include a retainer and a pressing member. The retainer retains the split core which has the coil installed in the two coil receiving parts such that the spacing between the pair pole pieces in the circumferential direction of the split core corresponds to the inner dimension of the coil in the circumferential direction of the split core. The pressing member presses the pair pole pieces with the split core retained by the retainer thereby deforming the split core such that the spacing between the pair pole pieces is increased to be longer than the inner dimension of the coil.

Further, as one aspect of the invention, when the split core is deformed in a direction of increasing the spacing between the pair pole pieces, the pair pole pieces may be moved in the direction of increasing the spacing between the pair pole pieces with a side of each of the pair pole pieces held in contact with an inner surface of the coil. By this movement, the pair pole pieces move the coil toward bases of the pair pole pieces through the openings of the two coil receiving parts, so that the pair pole pieces also serve to perform an operation of filling the coil into the coil receiving parts by deformation of the split core.

Further, as another aspect of the invention, an inclined surface of the side of each of the pair pole pieces may be utilized to move the coil toward the bases of the pair pole pieces. By utilizing the inclined surface, the coil can be efficiently moved toward the bottoms of the coil receiving parts while being slid on the pair pole pieces.

Further, as another aspect of the invention, the coil may be filled into the coil receiving parts by the movement of the coil toward the bases of the pair pole pieces. By thus filling the coil into the coil receiving parts, the receiving parts can be almost 100% or near-fully filled with the coil so that the efficiency in holding the coil can be increased.

According to the present invention, the ring-like tied coil can be easily installed and retained in the split core. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to manufacture motors and devices utilized therein. Representative examples of the present invention, which examples utilized many of these additional features and method steps in conjunction, will now be described in detail with reference to the drawings. This detailed description is merely intended to teach a person skilled in the art further details or practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment

Figure 5:
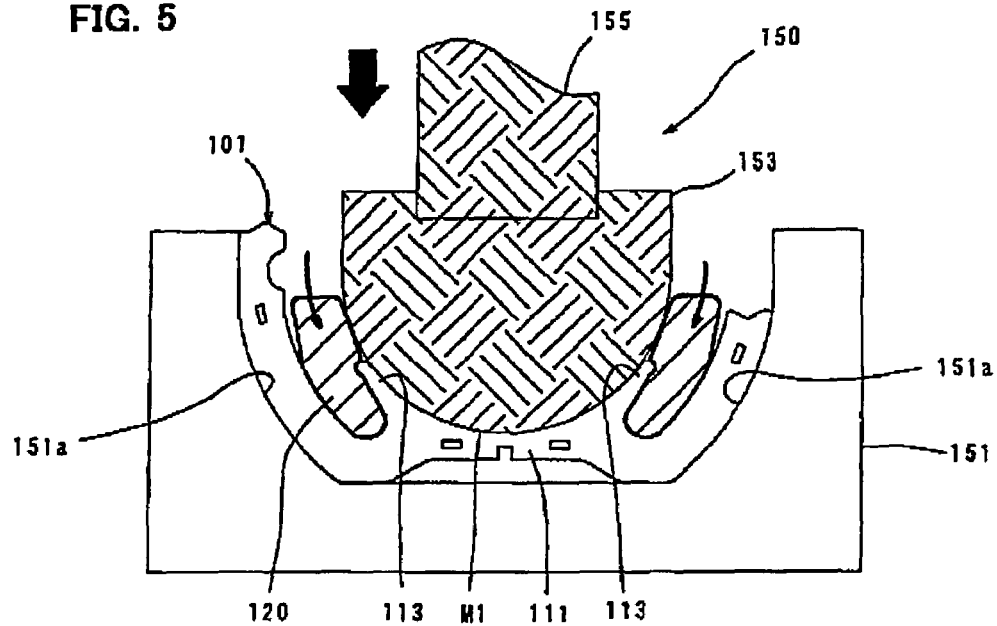
FIG. 5 illustrates a process step of bending back the stator field core half, in a state in which the stator field core half is pressed.
Figure 6:
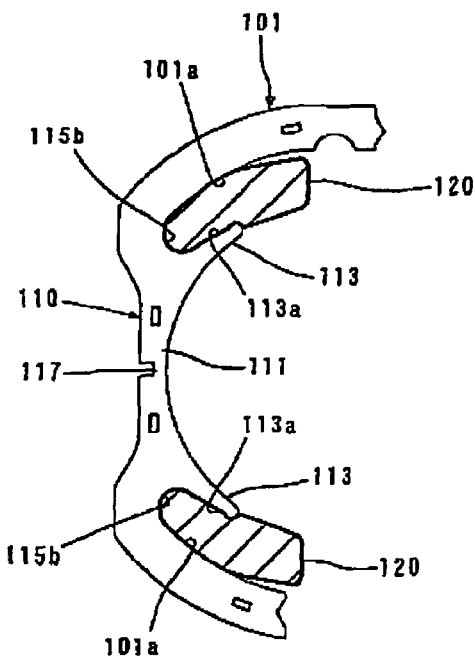
FIG. 6 illustrates a finished state in which the coil unit is installed in the stator field core half.
Figure 7:
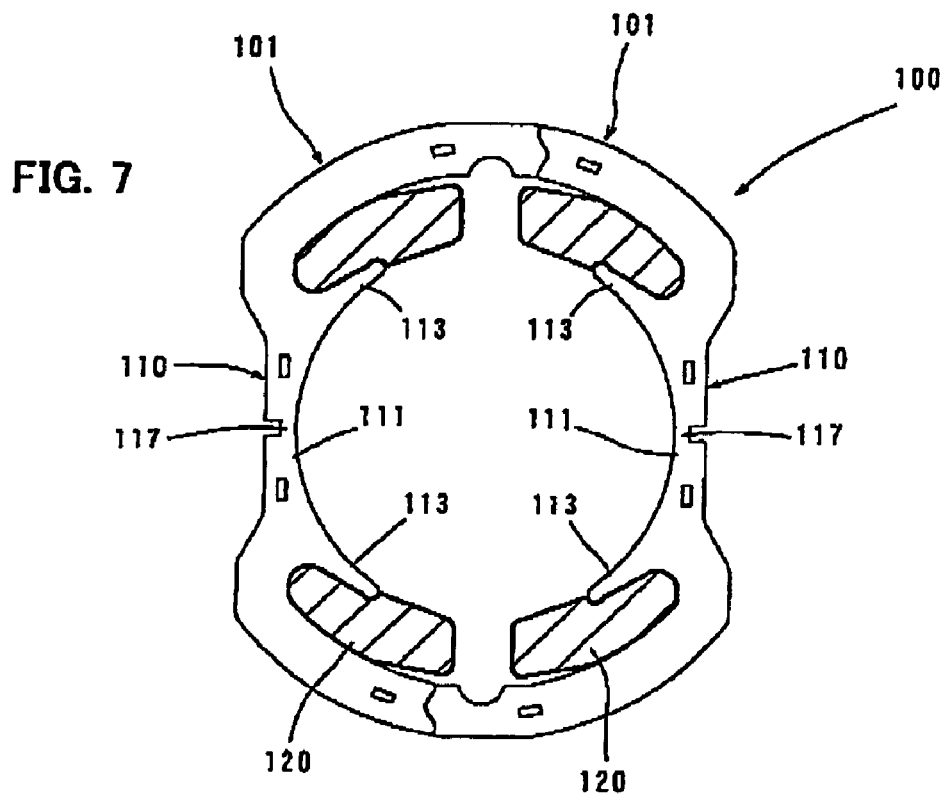
FIG. 7 is a sectional view showing a finished state of a stator core.
Figure 8:
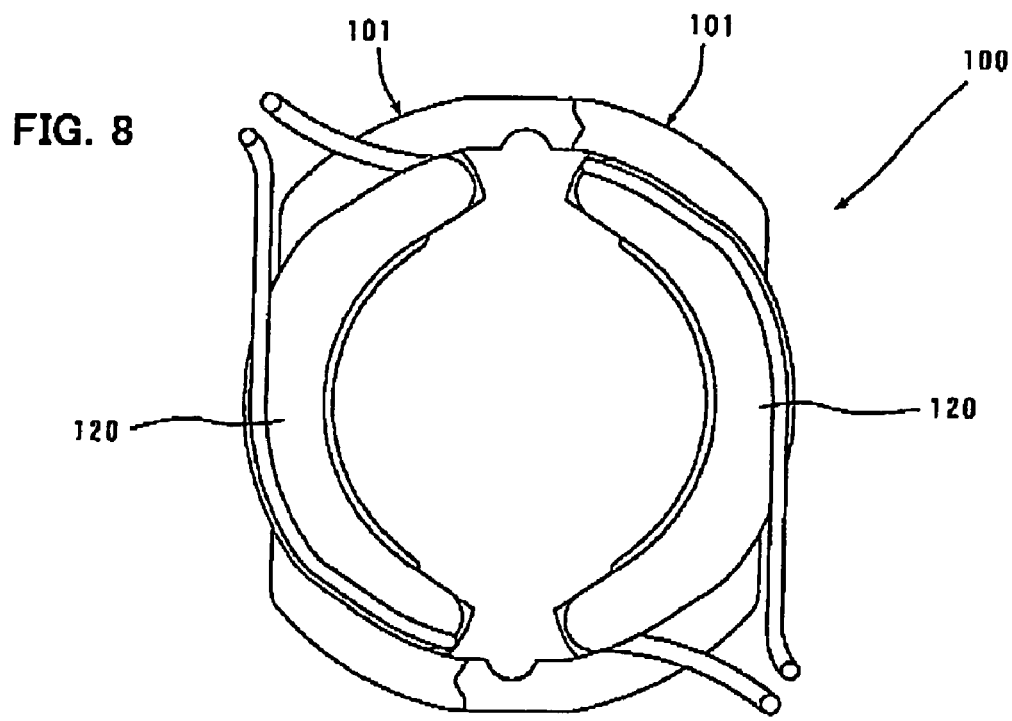
FIG. 8 is an outside view showing the finished state of the stator core.
Figure 9:
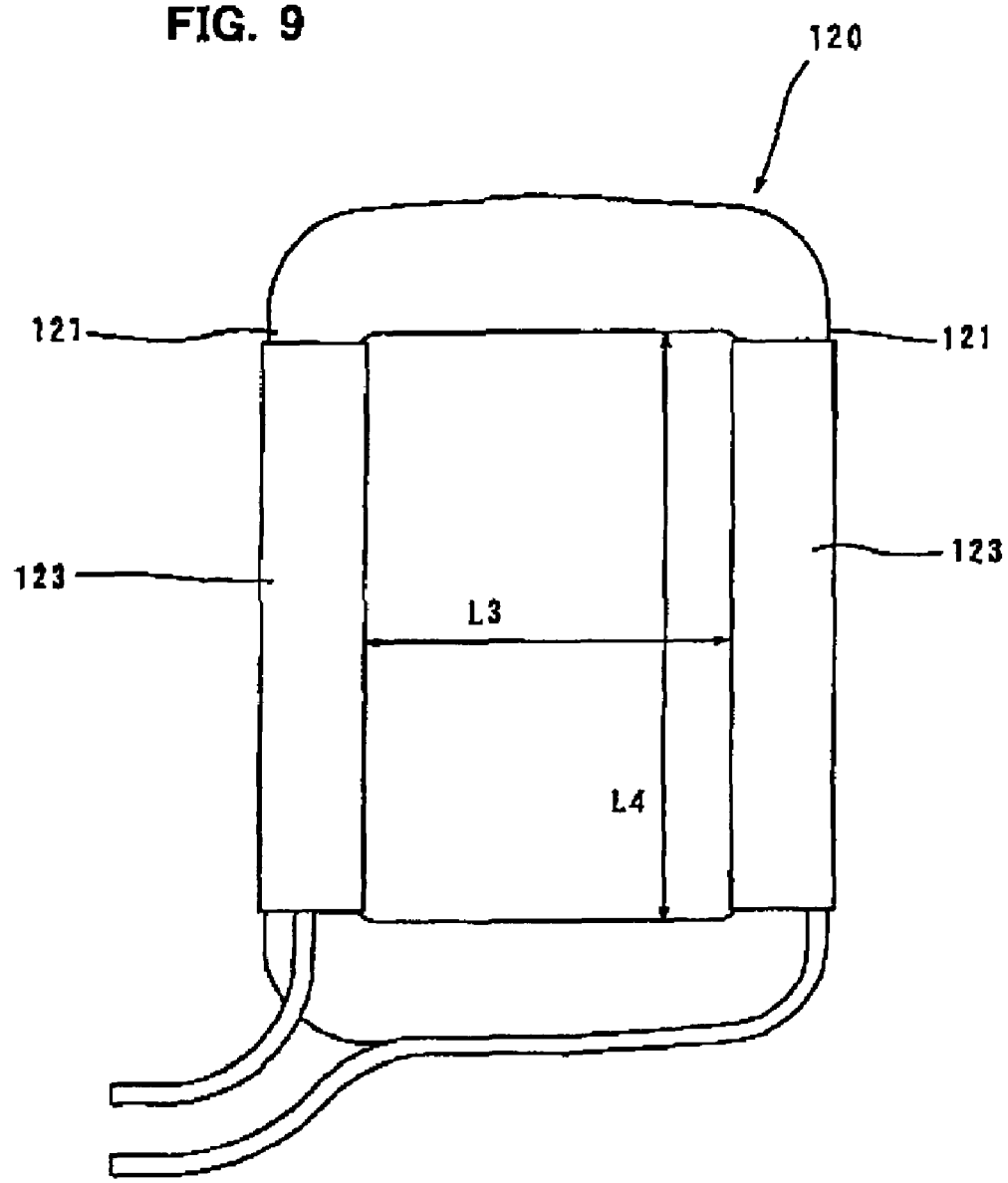
FIG. 9 shows a configuration of the coil unit.

An example of a representative embodiment of the invention will now be described with reference to FIGS. 1 to 9. In this embodiment, a method of manufacturing a stator core of an AC commutator motor (which may also be referred to as a universal motor or series motor) having a rotor and a stator will be described as an example. FIGS. 1 to 6 show a process of manufacturing a stator core, more particularly a process of assembling a coil unit to a field core half comprising a component of the stator core, step by step. FIGS. 7 and 8 show the finished stator core, and FIG. 9 shows the coil unit manufactured in a separate process.

Figure 1:
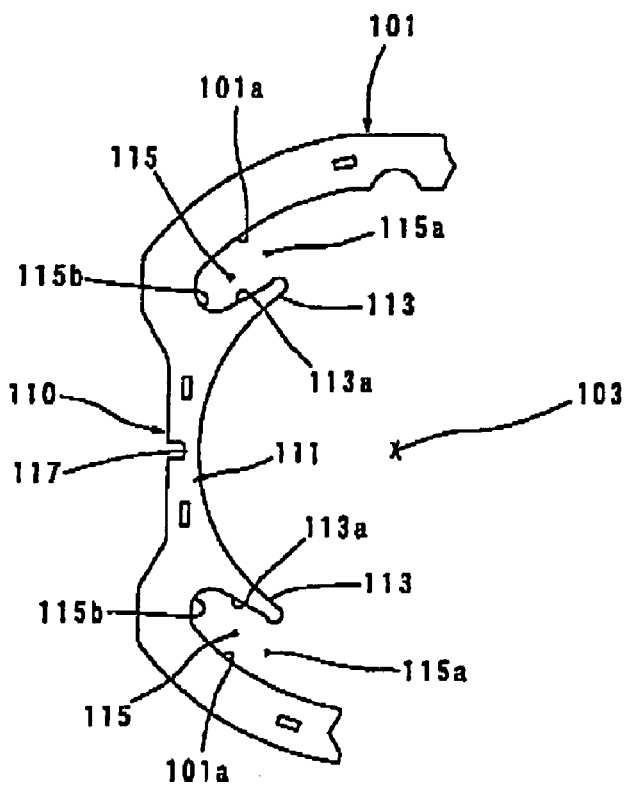
FIG. 1 is a sectional view showing a stator field core half in its initial state according to a first embodiment of the invention.

In this embodiment, as shown in FIG. 1, a stator field core half 101 is prepared in the first step of the process of manufacturing the stator core 100. The stator field core half 101 is a component of a hollow (cylindrical) stator core 100 (see FIG. 7) having open ends in the longitudinal direction. The stator field core half 101 has a generally C-shaped section obtained by halving the stator core 100 in the circumferential direction. The stator field core half 101 is an assembly which comprises a laminate of generally C-shaped steel sheets having an opening 103 inside (on the side of the hollow part of the stator core 100). In the final step of the manufacturing process, the stator core 100 is formed by assembling (joining) two such symmetrical stator field core halves 101 in such an orientation that they are opposed to each other with the opening 103 side facing inward. The laminated stator core 100 has a predetermined longitudinal length. The stator core 100 and the stator field core half 101 are features that correspond to the "stator" and the "split core", respectively, according to the invention.

As shown in FIG. 1, a field pole 110 is disposed on the inner peripheral side (inside) of the stator field core half 101. The field pole 110 includes a field core 111 extending toward the opening 103 and a pair of pole pieces 113 extending from both circumferential end regions of the field core 111 in a manner of intersecting with the field core 111. The pole pieces 113 are also referred to as a pole arc angle portion. The pair pole pieces 113 face each other with a predetermined spacing in the circumferential direction of the stator field core half 101 and extend in a generally arcuate form such that the spacing between the pair pole pieces generally increases toward the ends and is maximize at the end. The pair pole pieces 113 are generally symmetrical with respect to a midpoint in the circumferential direction of the stator field core half 101. Two slots 115 are defined in the both side regions of the field pole 110 and surrounded by the field core 111, the pair pole pieces 113 and an inner peripheral surface 101a of the field core 101. The slots 115 are used as spaces for receiving and retaining a coil unit 120 (which will be described below and shown in FIG. 9). Each of the slots 115 has an opening 115a on the tip end (extending end) side of the associated pole piece 113. The slots 115 are features that correspond to the "coil receiving parts" of the present invention.

Figure 10:
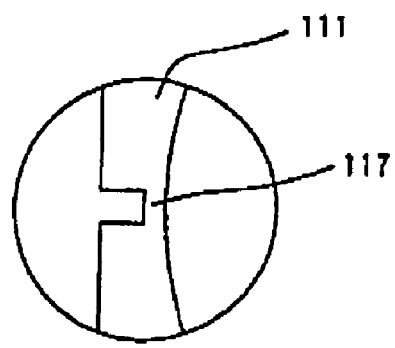
FIG. 10 shows a bending part (thin wall) formed in the stator field core half.
Figure 11:
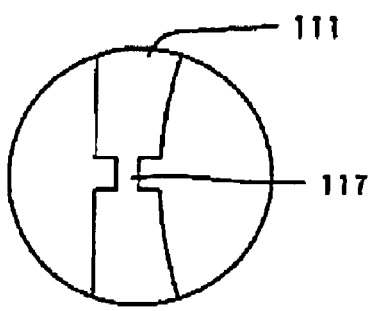
FIG. 11 shows a bending part (thin wall) formed in the stator field core half.
Figure 12:
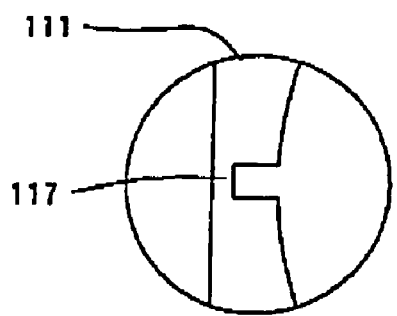
FIG. 12 shows a bending part (thin wall) formed in the stator field core half.
Figure 13:
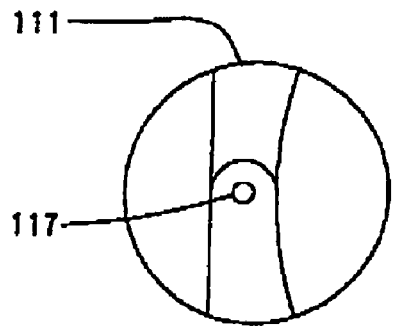
FIG. 13 shows a bending part (hinge) formed in the stator field core half.
Figure 14:
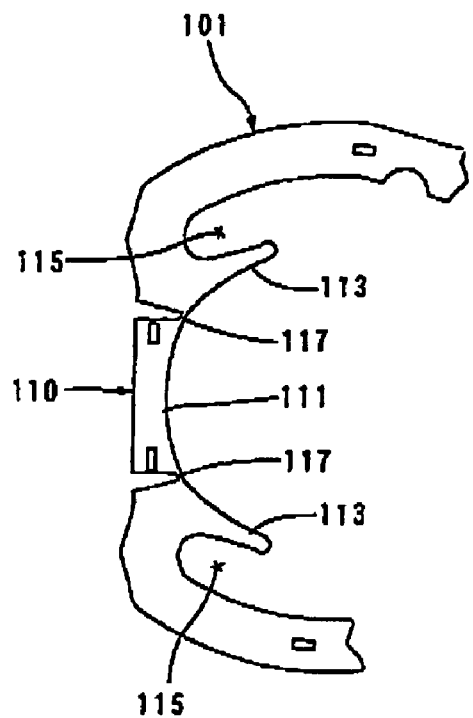
FIG. 14 shows two bending parts (thin walls) formed in the stator field core half.

A bending part 117 is formed substantially in the midpoint of the stator field core half 101 in the circumferential direction, or substantially in the midpoint of the field core 111 in the circumferential direction, and extends the length of the stator field core half 101 in the longitudinal direction. The bending part 117 includes a thin wall or a hinge which allows the stator field core half 101 to be bent in the radial direction. In order to form the thin-walled bending part 117, the thin wall may be formed on the inner peripheral side as shown in FIG. 10, or on the middle in the direction of the thickness (in the radial direction) as shown in FIG. 11, or on the outer peripheral side as shown in FIG. 12. Moreover, in place of the above-mentioned thin wall, a hinge as shown in FIG. 13 may also be used to form the bending part 117. Further, instead of forming one bending part 117 substantially in the midpoint of the stator field core half 101 in the circumferential direction, two (a plurality of) bending parts 117 may be formed as shown in FIG. 14.

Figure 2:
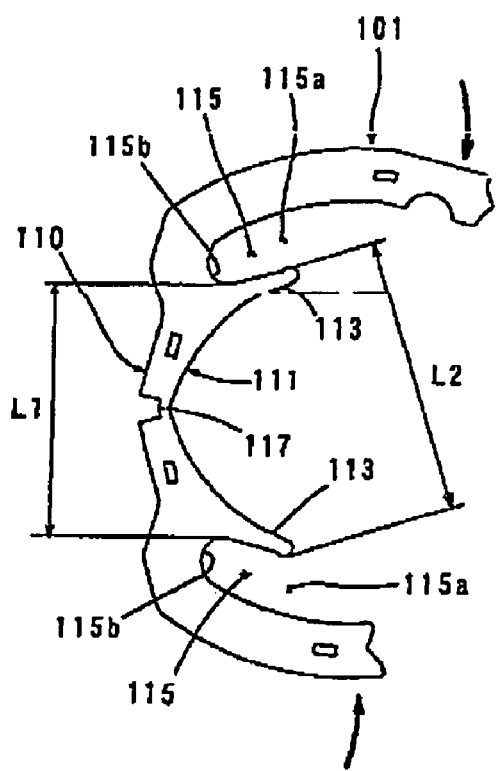
FIG. 2 illustrates a process step of bending the stator field core half inward

The stator field core half 101 is shown in its initial form in FIG. 1. In the second step, as shown in FIG. 2, the stator field core half 101 is bent a predetermined amount inward at the bending parts 117. The stator field core half 101 is bent such that a tip end outside distance L2 between the pair pole pieces 113 is narrowed to be substantially equal to a base outside distance L1 between the pair pole pieces 113 (the distance between bottoms 115a of the two slots 115) or an inside width L3 of a coil unit 120 which will be described below. Thus, the coil unit 120 is allowed to be inserted into the slots 115 through the openings 115a. The tip end outside distance L2 and the inside width L3 are features that correspond to the "spacing" and the "inner dimension", respectively, according to this invention. The stator field core half 101 is bent by plastic deformation. Further, preferably, the stator field core half 101 is bent by using a jig specifically designed for the bending operation and a pressure device, but it can also be bent by hand.

Figure 3:
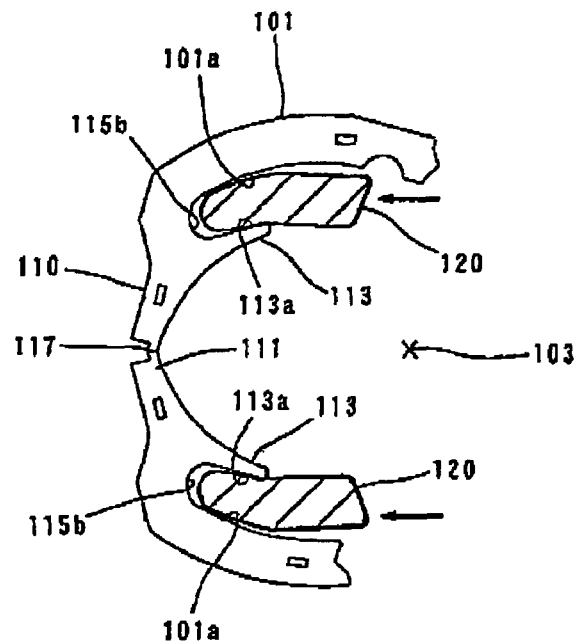
FIG. 3 illustrates a process step of inserting a coil unit into slots of the stator field core half.

Next, in the third step, as shown in FIG. 3, the coil unit 120 is inserted into the two slots 115 through the openings 115a. The coil unit 120 is a feature that corresponds to the "coil" according to this invention. The coil unit 120 includes a tied coil winding of a predetermined number of the and has a generally rectangular ring-like shape having side portions 121 wrapped in insulating paper 123 (see FIG. 9). The coil unit 120 is prepared in a separate process. The inside width L3 (the horizontal inner dimension as viewed in FIG. 9) of the coil unit 120 is substantially equal to or slightly longer than the base outside distance L1 between the pair pole pieces 113 (the distance between the bottoms 115a of the two slots 115) of the yet-to-be bent stator field core half 101. Further, an inside height L4 (the vertical inner dimension as viewed in FIG. 9) of the coil unit 120 is slightly longer than the axial length of the stator field core half 101. Specifically, in the third step, the coil unit 120 having the tied coil winding is inserted into the slots 115 through the openings 115a. At this time the coil unit 120 can be smoothly inserted into the slots 115 without interfering with the pole pieces 113 because the tip end outside distance L2 between the pair pole pieces 113 is substantially equal to or narrower than the inside width L3 of the coil unit 120.

Figure 4:
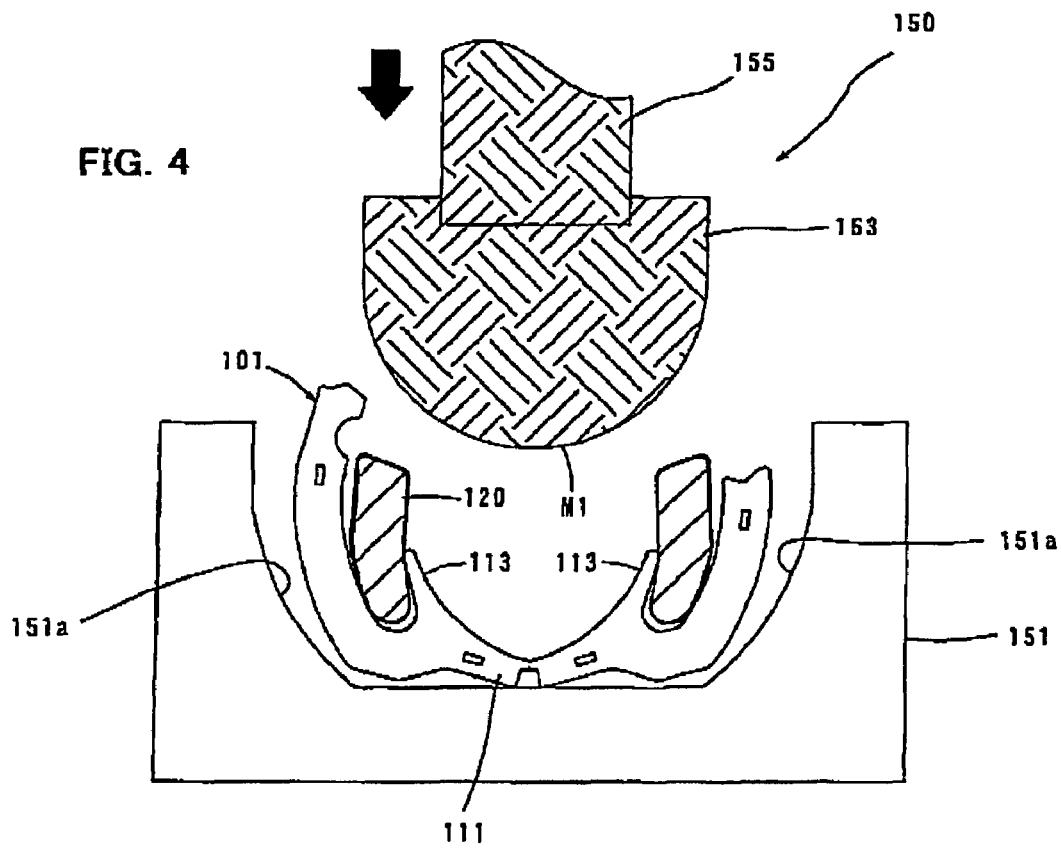
FIG. 4 illustrates a process step of bending back the stator field core half in a state in which the stator field core half is yet to be pressed.

Next, in the fourth step, the stator field core half 101 is bent back into the initial form shown in FIG. 1 by using a pressure device 150 shown in FIG. 4. The pressure device 150 includes a retaining base 151 that securely retains the stator field core half 101 and a pressure member 153 that presses and bends back the stator field core half 101 retained on the retaining base 151. The retaining base 151 is substantially U-shaped in section and has an inner 151a shaped to correspond to the outer shape of the stator field core half 101 yet to be bent in the initial state. As shown, the pressure member 153 has a lower surface having a predetermined arcuate shape M1 for pressing the inner surfaces of the coil unit 120 and the pair pole pieces 113. The retaining base 151 and the pressure member 153 are features that correspond to the "retainer" and the "pressing member" respectively, according to this invention.

As shown in FIG. 4, the stator field core half 101 is placed in the retaining base 151 in such an orientation that the opening 103 faces upward. In other words, the stator field core half 101 is placed in the retaining base 151 such that the pair field poles 110 are opposed to each other in the horizontal direction. Thereafter, as shown in FIG. 5, the pressure member 153 is moved downward from above toward the stator field core half 101 by using an actuator 155 such as an air cylinder. The pressure member 153 then presses the inner surface of the coil unit 120 and the pair pole pieces 113 by the arcuate surface M1. As a result, the stator field core half 101 is bent around the bending part 117 outward in the direction that increases the tip end outside distance L2 between the pair pole pieces 113 and returned to the initial form shown in FIG. 1.

When the coil unit 120 is pressed by the arcuate surface M1 of the pressure member 153, the coil unit 120 is acted upon by an obliquely downward force as viewed in FIG. 5. Further, at the same time, the pair pole pieces 113 are moved in the direction that increases the tip end outside distance L2 while an outer surface 113a of each of the pole pieces 113 is held in contact with the inner surface of the coil unit 120. Thus, the coil unit 120 is also acted upon by a force of moving the coil unit 120 downward via the inclined outer surface 113a of the pole piece 113. As a result, the coil unit 120 is moved toward the bottoms 115b of the two slots 115 or toward the bases of the pole pieces 113 while being elastically deformed in such a manner as to be widened outward (increasing the width L3). The outer surface 113a is a feature that corresponds to the "side" according to this invention. In this manner, the slots 115 are almost fully filled with the coil unit 120. The coil unit 120 thus filled in the slots 115 is retained by the outer surfaces 113a of the pair pole pieces 113 with the increased tip end outside distance L2 and the inner peripheral surface 101a of the stator field core half 101. Thus, as shown in FIG. 6, the stator field core half 101 having the coil unit 120 properly installed in the slots 115 is obtained. The inner wall surface 151a of the retaining base 151 is complementary to the final outer shape of the stator field core half 101. Therefore, the final shape of the stator field core half 101 can be stabilized.

The circumferential end surfaces of the two such stator field core halves 101 are butted together in such an orientation that the stator field core halves 101 are opposed to each other on the side of the openings 103. The butted surfaces are joined together, for example, by welding. Thus, the stator core 100 with the coil unit 120 installed is manufactured (see FIGS. 7 and 8).

In this embodiment, the stator field core half 101 is once bent inward such that the tip end outside distance L2 between the pair pole pieces 113 is narrowed. In this state, the ring-like coil unit 120 which was prepared in advance is inserted into the slots 115 through the openings 115a. Thereafter, the stator field core half 101 is bent back in a direction of increasing the tip end outside distance L2 between the pair pole pieces 113. Thus, the coil unit 120 installed in the slots 115 is retained by the pair pole pieces 113 and the inner peripheral surface 101a of the stator field core half 101. By forming the field pole 110 using the tied coil unit 120, the coil winding of many turns within the slots 115 is prevented from coming apart and being disengaged from the field pole 110 over the ends of the pole pieces 113. Moreover, use of the tied coil unit 120 eliminates the need for the pole pieces 113 to retain the entire coil unit (each turn of the coil winding of the coil unit). Therefore, the number of turns of the coil winding is not restricted by the length of the pole pieces 113, so that the number of turns of the coil winding to be inserted into the limited space of the slots 115 can be effectively increased.

Further, in this embodiment, when the stator field core half 101 is bent back into the initial form shown in FIG. 1 after insertion of the coil unit 120 into the slots 115, the coil unit 120 is moved toward the bottoms 115b of the slots 115. Thus, the coil unit 120 can be efficiently installed (filled) into the slots 115, so that the efficiency in holding the coil unit 120 can be increased.

Further in this embodiment provision is made for the construction in which the ring-like tied coil unit 120 is inserted into the slots 115 through the openings 115a. Particularly by using the stator field core halves 101, the space on the side of the inner peripheral surface of the stator field core halves 101 can be utilized to easily install the coil unit 120 in the slots 115. Further, as clearly seen from FIG. 7, even the coil unit 120 larger than the space of the slots 115 and longer in the axial direction (the hole extending direction) can be installed. If the stator core 100 is not configured in the two-part structure, in order to avoid interference between the coil units 120 when inserting the coil units 120 into the slots 115, the axial length of the coil unit 120 to be installed in the slots 115 is restricted. However, with the two-part structure like in this embodiment no interference occurs between the coil units 120 when the coil units 120 are inserted into the slots 115. Therefore, the amount of the coil unit 120 to be installed can be increased without ceasing the size of the stator core 100.

Second Embodiment

Figure 15:
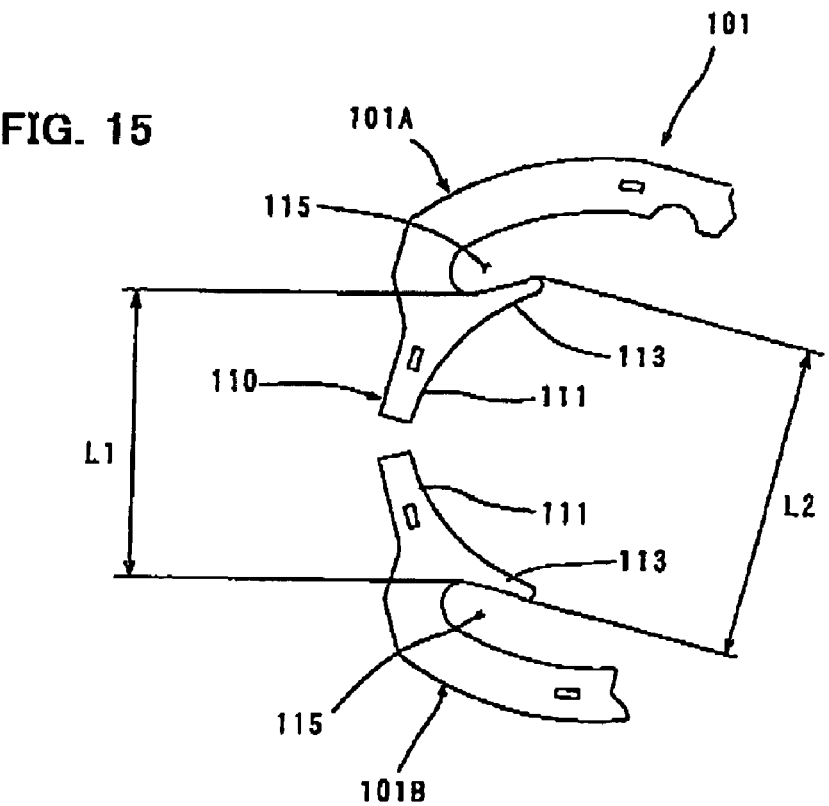
FIG. 15 illustrates the manufacturing of the stator field core half according to a second embodiment of the invention.
Figure 16:
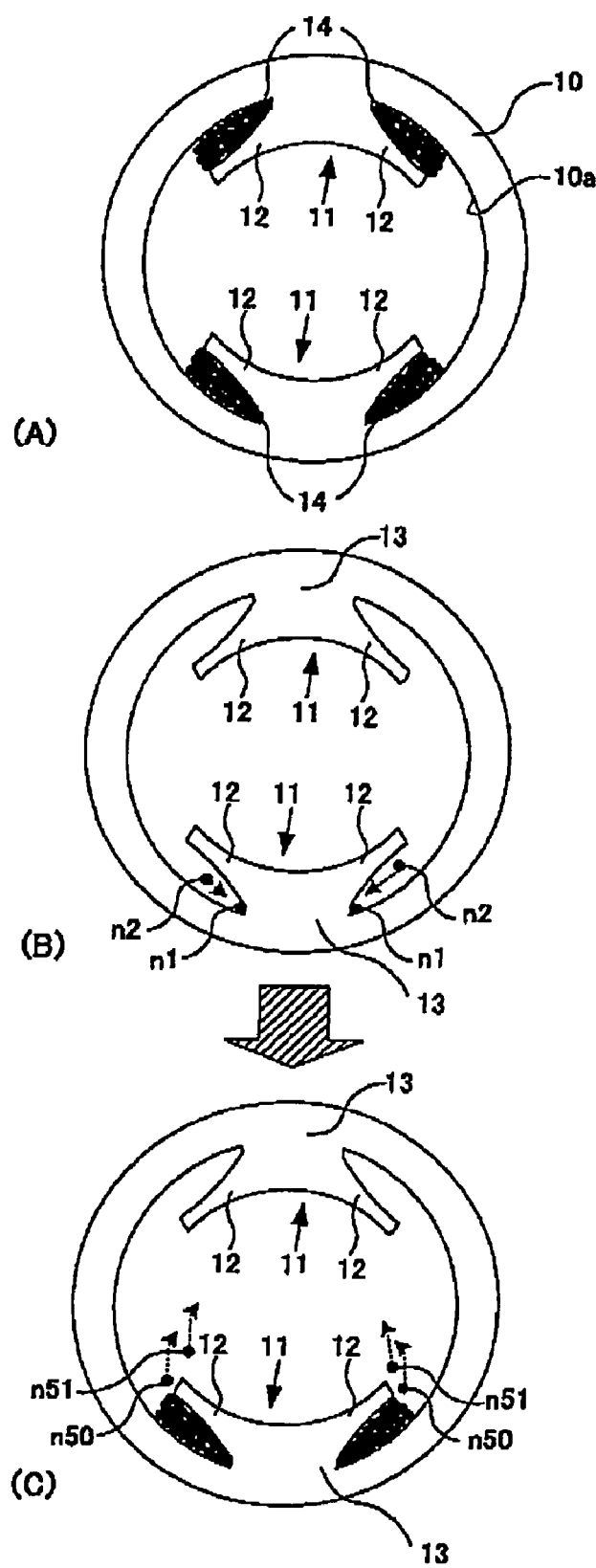
FIGS. 16(A), 16(B) and 16(C) schematically show a prior art stator.

A second embodiment of the present invention will now be explained with reference to FIG. 15. In this embodiment, the stator field core half 101 is further divided into two halves in the middle of the stator field core half 101 in the circumferential direction and includes a first split core section in the form of a first split stator field core 101A and a second split core section in the form of a second split stator field core 101B. Each of the first and second split stator field cores 101A, 101B has a field core 111, a pole piece 113 and a slot 115. Like in the first embodiment, each of the fist and second split stator field cores 101A, 101B is formed as an assembly which comprises a laminate of steel sheets and includes the field core 111, the pole piece 113 and the slot 115.

Specifically, the stator field core half 101 according to the second embodiment includes the first and second split stator field cores 101A, 101B obtained by halving the stator field core half 101 generally in the middle of the region of the field core 111 of the first embodiment in the circumferential direction. The first split stator field core 101A has one of the pair pole pieces 113 and one of the slots 115, and the second split stator field core 101B has the other pole piece 113 and the other slot 115.

In order to insert the ring-like tied coil unit 120 into the slots 115 though the openings 115a, the first and second split stator field cores 101A, 101B having the above-mentioned construction are placed such that the tip end outside distance L2 between the pole pieces 113 is substantially equal to the base outside distance L1 between the pole pieces 113 (the distance between the bottoms 115a of the slots 115) or the inside width L3 of the coil unit 120. In this state, the coil unit 120 is inserted into the slots 115 through the openings 115a. Thereafter, the dividing surfaces of the fist and second split stator field cores 101A, 101B are butted together and the first and second split stator field cores 101A, 101B are moved in a direction of increasing the spacing between the pole pieces 113. In other words, the relative position of the first and second split stator field cores 101A, 101B is changed such that the spacing between the pair pole pieces 113 is increased to be longer than the inside width L3 of the coil unit 120. As a result, the coil unit 120 installed in the slots 115 is elastically deformed in a direction of increasing the width L3 and retained by the pole pieces 113.

In this state, the dividing surfaces of the first and second split stator field cores 101A, 101B are joined together, for example, by welding. Thus, the stator field core half 101 is formed. Then, the circumferential ends of the two such stator field core halves 101 are butt-joined together. Thus, the stator core 100 shown in FIGS. 7 and 8 can be obtained.

The pressure device 150 of the fist embodiment can be used to change the relative position of the first and second split stator field cores 101A, 101B in a direction of increasing the spacing between the pole pieces 113 after insertion of the coil unit 120 into the slots 115.

Representative embodiments according to the invention are provided as described above. In the first embodiment, the stator field core half 101 having the shape shown in FIG. 1 is bent inward such that the tip end outside distance L2 between the pair pole pieces 113 is narrowed to be substantially a to the base outside distance L1 between the pair pole pieces 113. However, the process step of bending the stator field core half 101 may be eliminated by forming the stator field core half 101 into the bent shape shown in FIG. 2, in advance, which shape is taken as its initial form in this case. Specifically, the stator field core half 101 may be formed in advance such that the spacing between the pair pole pieces 113 corresponds to the inside width L3 of the coil unit 120.

In the first and second embodiments, the motor manufacturing method according to the invention is described in which the field coils are installed on the stator core of the AC commutator motor such that the field poles are formed. However, the present invention can be suitably applied to techniques of manufacturing various kinds of motors having field poles on the inside surface of the stator core.

Further, the first and second embodiments are described as having two field poles on the inside surface of the stator core. However, the present invention can be suitably applied to techniques of manufacturing a motor having three or more field poles (such as an induction motor and a brushless motor).

Further, according to the invention, the split core may have a bending part that is formed at a predetermined location in the circumferential direction of the split core and can be bent. And the split core is bent at the bending part, with the coil installed in the two coil receiving parts, such that the spacing between the pair pole pieces is increased to be longer than the inner dimension of the coil.

Further, according to the invention, the split core may include a first split core section and a second split core section which are obtained by halving the split core substantially in the middle of a region of the field core in the circumferential direction. The first split core section may have one of the pair pole pieces and one of the coil receiving parts, while the second core section may have the other pole piece and the other coil receiving part. The first and second split core sections may be moved away from each other, while the coil being installed in the two coil receiving parts, such that the spacing between the pair pole pieces is increased to be longer than the inner dimension of the coil.

DESCRIPTION OF NUMERALS 100 stator core (stator)
101 stator field core half (split core)
101a inner peripheral surface
103 opening
110 field pole
111 field core
113 pole piece
113a outer surface (side)
115 slot (coil receiving part)
115a opening
115b bottom
117 bending part
120 coil unit (coil)
121 side portion
123 insulating paper
150 pressure device
151 retaining base (retainer)
151a inner surface
153 pressure member (pressing member)
M1 arcuate shape
155 actuator
101A split stator field core (split core section)
101B split stator field core (split core section)

I claim:

1. A method for manufacturing a motor, the motor including a stator, a split core and a coil, wherein the split core defines a part of the stator that has substantially a cylindrical shape, the coil is wound into a ring-like form and tied in advance, and the tied coil is mounted to the split core, and wherein the split core includes a field core extending from an inner peripheral surface of the split core, a pair of pole pieces extending from both circumferential ends of the field core in a manner of intersecting with the field core, and two coil receiving parts defined by the field core, the pair pole pieces and the inner peripheral surface of the split core, each of the coil receiving parts having an opening on the tip end side of the associated pole piece, the coil being installed in the two coil receiving parts, the method comprising:

preparing the split core such that the spacing between the pair pole pieces in the circumferential direction of the split core corresponds to the inner dimension of the coil in the circumferential direction of the split core, the split core having a bending part at a predetermined location in the circumferential direction of the split core, inserting the tied coil into the two coil receiving parts through the openings and deforming the split core such that the spacing between the pair pole pieces is increased to be longer than the inner dimension of the coil, wherein the deforming the split core includes bending the split core at the bending part with the coil being installed in the two coil receiving parts.

2. The method as defined in claim 1, wherein the motor comprises a plurality of the split cores and coils corresponding to the split cores and at least one of the split cores comprises the field core, the pole pieces and the coil receiving parts.

3. The method as defined in claim 1, wherein, when the split core is deformed in a direction of increasing the spacing between the pair pole pieces, the pair pole pieces are moved in the direction of increasing the spacing between the pair pole pieces in contact with an inner surface of the coil, thereby moving the coil toward bases of the pair pole pieces through the openings of the two coil receiving parts, such that the pair pole pieces also serves to perform an operation of filling the coil into the coil receiving parts by deformation of the split core.

4. The method as defined in claim 3, wherein each pole piece comprises an inclined surface on the side, and the inclined surface being utilized to move the coil toward the bases of the pole piece.

5. The method as defined in claim 3, wherein the coil is filled into the coil receiving parts by utilizing the movement of the coil toward the bases of the pair pole pieces.

6. The method as defined in claim 1, wherein the bending part comprises one or more thin wall parts formed in the field core at a predetermined location in the circumferential direction.

7. The method as defined in claim 1, wherein the bending part comprises one or more hinges that rotatably connects both sections of the field core on the both sides in the circumferential direction.

8. The method as defined in claim 1, wherein the split core includes a first split core section and a second split core section which are provided by halving the split core substantially in the middle of a region of the field core in the circumferential direction, the first split core section having one of the pair pole pieces and one of the coil receiving parts, and the second core section having the other pole piece and the other coil receiving part and the first and second split core sections are moved away from each other while the coil is installed in the two coil receiving parts such that the spacing between the pair pole pieces is increased to be longer than the inner dimension of the coil.

* * * * *